Aug. 19, 1952   G. E. COXON   2,607,228
PRESSURE GAUGE
Filed Aug. 27, 1945   2 SHEETS—SHEET 1
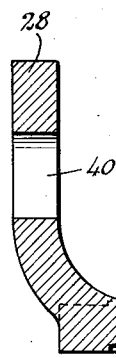
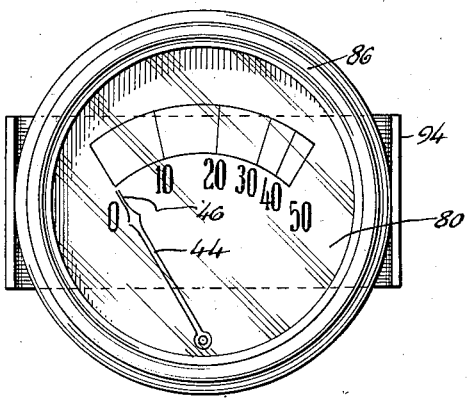
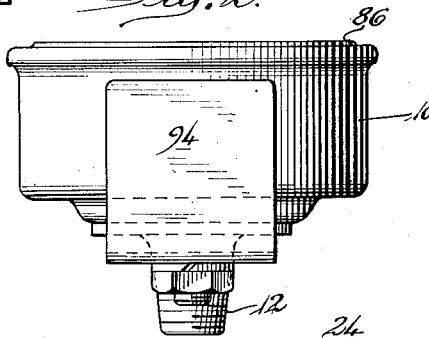
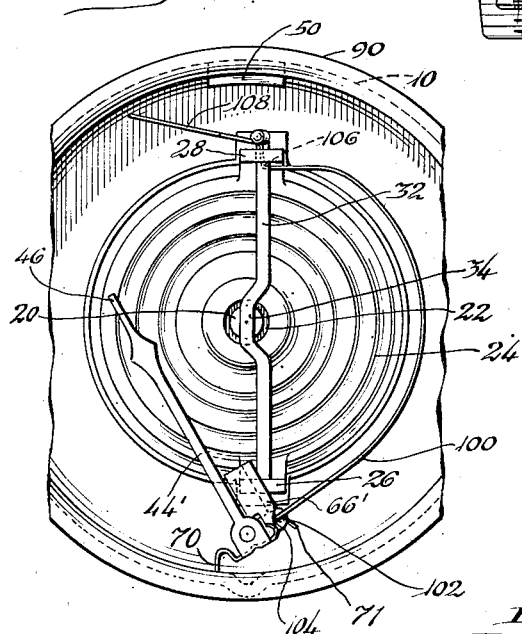
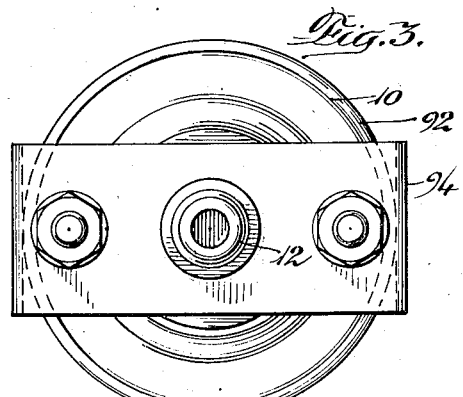
Inventor:
George E. Coxon
By Williams, Bradbury & Hinkle
Attorneys.

Patented Aug. 19, 1952

2,607,228

UNITED STATES PATENT OFFICE 2,607,228

PRESSURE GAUGE

George E. Coxon, Cicero, Ill., assignor to Stewart-Warner Corporation, Chicago, Ill., a corporation of Virginia Application August 27, 1945, Serial No. 612,873

7 Claims. (Cl. 73—408)

My invention relates to pressure gauges, and is more particularly concerned with pressure gauges of the diaphragm type.

An object of my invention is to provide a new and improved pressure gauge which is cheaper to manufacture than comparable pressure gauges of the prior art.

Another object of my invention is to provide a new and improved pressure gauge of simplified construction.

Another object of my invention is to provide a new and improved pressure gauge which can be more easily assembled than the pressure gauges of the prior art.

Other objects and advantages will become apparent as the description proceeds.

In the drawings,

Fig. 1 is a top or face view of a pressure gauge embodying my invention;

Fig. 2 is a side elevation of the pressure gauge shown in Fig. 1;

Fig. 3 is a bottom plan view of the pressure gauge shown in Figs. 1 and 2;

Fig. 6 is a side elevation of the diaphragm backing plate;

Fig. 7 is an enlarged sectional view through a portion of this backing plate, and Fig. 8 is a view similar to Fig. 4 but showing a modified construction.

Figure 5:
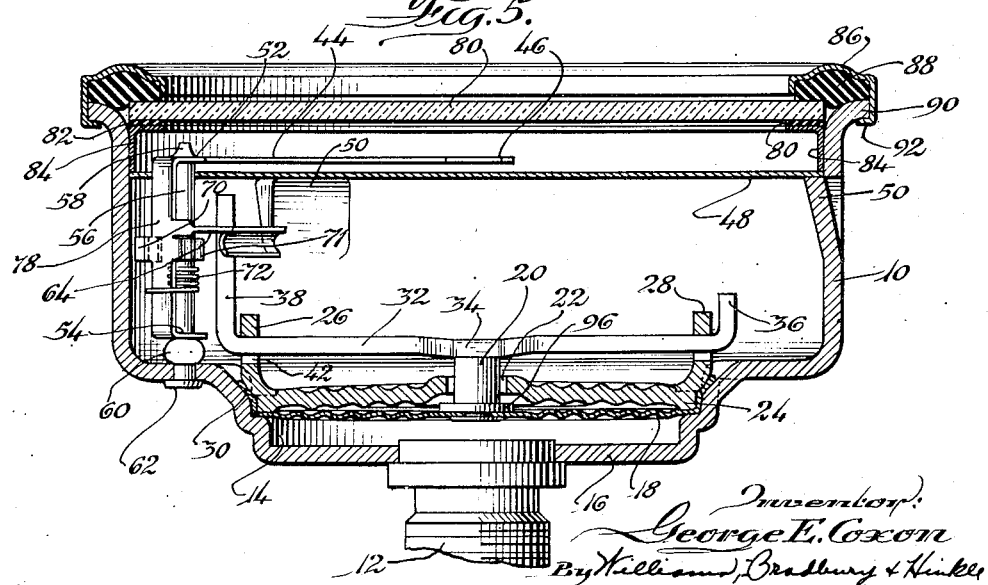
Fig. 5 is a vertical sectional view taken on the line 5—5 of Fig. 4.

Referring particularly to Fig. 5, it will be seen that I have therein shown a form of my invention comprising a cup-shaped metal case 10 attached to a nipple 12 through which fluid under pressure enters a diaphragm chamber 14 formed between a base portion 16 of the cup 10 and a metal diaphragm 18 having a pointer operating stud 20 affixed to the central portion thereof. The stud 20 is freely movable in an opening 22 formed in a backing plate 24 having upstanding ears 26 and 28. The backing plate 24 and diaphragm 18 are secured in place in the cup 10 by soldering as indicated at 30, or in any other suitable manner.

A crank 32 is mounted in suitable openings provided in the upstanding ears 26 and 28 and is formed of a rod or heavy wire bent to provide an offset central portion 34 which is engaged and driven by the stud 20 affixed to the diaphragm 18. The ends of the crank 32 are bent upwardly as indicated at 36 and 38 to prevent longitudinal displacement of the crank relative to the ears 26 and 28 and stud 20. Referring to Fig. 7, it will be seen that the ear 28 is provided with a vertically elongated slot 40 through which the bent end 36 of the crank may be readily inserted. The other ear 26 is provided with a bayonet slot 42 for readily receiving that portion of the crank 32 which is adjacent the upturned end 38. The crank 32 is held in engagement with the upper extremities of slots 40 and 42 by force exerted by the diaphragm 18 through stud 20.

A pointer 44 has a needle-like end 46 overlying a scale as clearly shown in Fig. 1 and cooperating therewith to indicate the pressure of the fluid in the diaphragm chamber 14. This scale is carried by a dial 48 supported on inwardly bent fingers 50, pressed out of the case 10. The pointer 44 has bearing portions 52 and 54 pivotally mounted on a pin 56 whose upper end 58 is spun over to prevent displacement of the pointer 44. This pin 56 has punched out portions 60 which engage the inner surface of the case 10 and the outer end of this pin is riveted over as indicated at 62 to secure the pin and pointer in place.

The pointer 44 is formed of sheet metal and has an operating arm 64 which is twisted as indicated at 66 and provided with a curved upper portion 68 adapted to engage end 38 of crank 32. The pointer 44 also has an integral stop 70 which engages the case 10 to determine the zero position of the pointer and which may be bent to adjust the zero position. A second integral stop 71 limits the maximum travel of the pointer and ensures that under the most severe operating conditions or handling in shipment or otherwise the crank will never become disengaged from the calibrating arm sufficiently to cause the gauge to become inoperative. The pointer is normally held in zero position by a torsion spring 72 wrapped about the pin 56 and having one end 74 engaging the case 10 and a second end 76 located in a hole suitably provided in the pointer base 78.

The pointer 44 is protected by a glass 80 supported by washer 82 and ring 84. The ring 84 in turn rests on dial 48 mounted on inwardly bent fingers 50. The glass 80 is held in place by a bezel 86 which compresses a gasket 88 against the glass 80 and the outwardly flared rim 90 of the case 10 to form a liquid tight seal which prevents liquid and dirt from entering the case 10. The lower edge 92 of the bezel 86 is rolled over beneath the flaring portion 90 of the case to secure the bezel firmly to the upper end of this case. In Figs. 1, 2, and 3 the instrument is provided with a mounting bracket 94 such as may be convenient for mounting the instrument on the dashboard of an automobile where the instrument is used as an oil pressure gauge. This mounting bracket is, of course, not essential and is shown as being omitted in Fig. 5.

The operation of this embodiment of my invention is as follows:

When the parts are at rest, the pointer 44 is held in the zero position by torsion spring 72 which presses the top 70 against the case 10. As previously explained, the stop 70 is adjusted by bending or otherwise so that when this stop engages the case, the pointer is at the zero position of the indicia on the dial 48. In this zero position of the gauge, metal diaphragm 18 exerts sufficient upward pressure on stud 20 and crank 32 to hold this crank in the upward ends of the slots 40 and 42 in ears 26 and 28, respectively, and to hold upturned ends 38 of the crank lightly in engagement with the rounded portion 68 of the pointer operating arm 64. The force exerted by the diaphragm 18, however, is not sufficient to overcome the torsion spring 72 and move the pointer from the zero position.

When fluid under pressure enters diaphragm chamber 14 through nipple 12, the increased fluid pressure in this chamber exerts an upward force on diaphragm 18 and produces an upward movement of the central portion of this diaphragm and the stud 20 attached thereto. This upward movement of stud 20 produces a corresponding movement of the offset portion 34 of the crank 32 and rotates this crank to produce a corresponding movement of the upturned end 38 and pointer arm 64. I have found it desirable to locate the pointer supporting pin 56 slightly to one side of the axis of the main portion of the crank and to bend the crank engaging portion 68 of the pointer operating arm so that this portion is parallel to the pointer 44. This particular arrangement gives one set of relationships between pointer and crank for the different angular positions of the crank. It will, of course, be understood that a different set of relationships can be obtained by a different location of the pin 56 or by bending the curved, pointer-engaging portion of the portion 68 of the pointer operating arm to a different position from that shown.

It will be apparent from an inspection of Fig. 1 that equal increases in fluid pressure in the diaphragm chamber 14 produce successively smaller movements of the pointer 44 and that the scale on the dial 48 is calibrated accordingly. The backing plate 24 is stamped or otherwise formed to give it a wave-like cross section corresponding to that of the diaphragm 18 so that this backing plate provides a proper support for those portions of the diaphragm which are moved into engagement with the backing plate by fluid pressure in the chamber 14. The stud 20 is illustrated as having an enlargement 96 which is of greater diameter than the opening 22 in the backing plate and overlies the walls of this opening when the diaphragm is fully compressed so that excessive pressure in the chamber 14 will not injure the diaphragm or change the calibration of the instrument.

In Fig. 8 I have shown a modified form of my invention in which the helical spring 72 of the previous embodiment is replaced by a U-shaped spring 100 which has a hooked end 102 engaged in an opening 104 formed in the operating arm 66' of the pointer 44'. The other end of the spring 100 has an offset portion 106 which is located in the slot 40 of the ear 28 immediately beneath the crank 32 whereby this end of the spring 100 is anchored in the ear 28. The extreme end 108 of the spring 100 extends beyond the ear 28 an appreciable distance and effectively prevents accidental displacement of the portion 106 from the slot in the ear. In all other respects the improvement of Fig. 8 may be identical with that of the previous embodiment.

Figure 4:
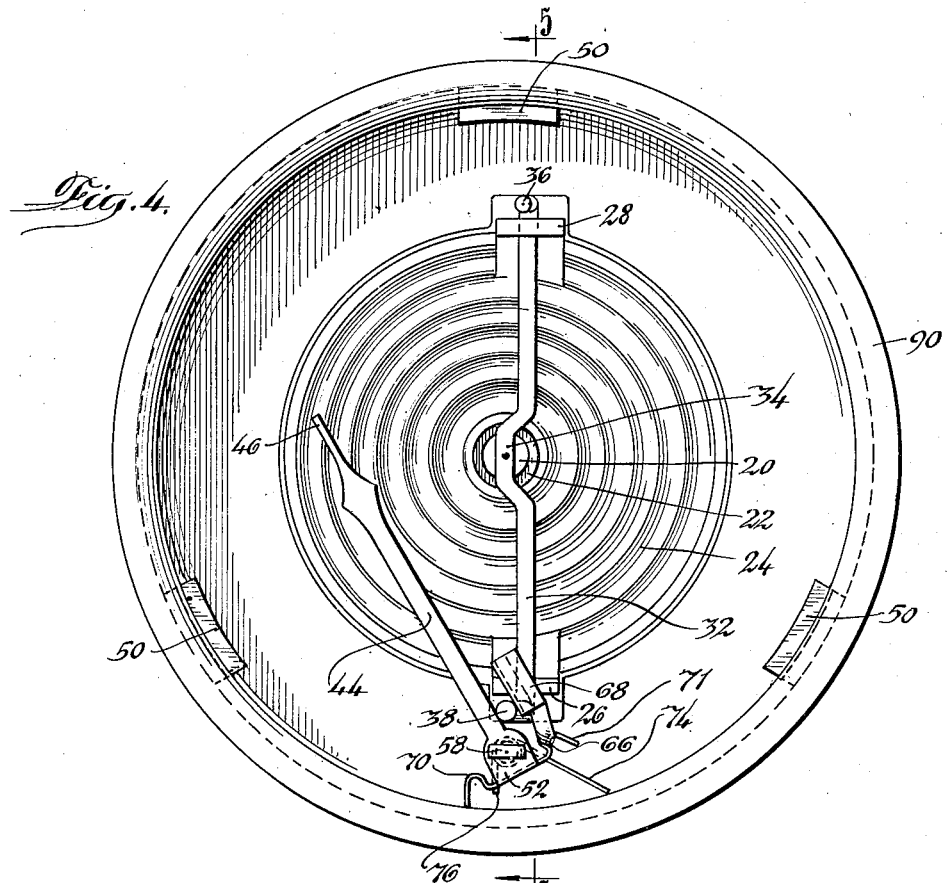
Fig. 4 is an enlarged top view of the pressure gauge with the bezel, glass and dial removed.

One of the important advantages of my new and improved pressure gauge is the ease with which this gauge may be calibrated. Such calibration can be effected by bending the crank engaging portion of the pointer operating arm 64 to different positions. Bending this arm to the right or left as viewed in Fig. 4 changes the zero position of the crank 32 and diaphragm 18 whereas bending this arm up and down as viewed in Fig. 5 will change the rate of pointer travel for a given movement of the diaphragm and crank.

Another advantage of my pressure gauge lies in the uneven distance between equal differences in pressure on the scale. In other words, a given difference in pressure at the lower end of the scale produces a larger point movement than the same difference in pressure at the higher end of the scale. This is desirable in that it permits more accurate reading of the pressures at the lower end of the scale which serves as the danger signal end for indicating pressure failures in the automobile lubricating system or other fluid system to which the gauge may be connected.

From the foregoing description of my invention, it will be apparent that I have designed an instrument composed of only a few simple parts which may be readily mass produced by conventional methods and equipment. The few simple parts may be readily assembled and quickly adjusted to give the instrument the proper calibration, and thereafter such calibration will be maintained for the life of the instrument. The instrument is adequately protected against excessive pressures and is designed to give long service without adjustment or repair.

It will be understood that my invention is not limited to the particular details shown and described but may assume numerous other forms and includes all variations, modifications, and equivalents coming within the following claims.

I claim:

1. An integral sheet metal pointer, comprising a pointer arm, a U-shaped base having spaced bearing portions, a stop arm extending from one side of said base and an operating arm extending from the other side of said base, said operating arm having a twisted portion terminating in a semi-cylindrical driven portion parallel with the pointer arm and adapted to engage a driving means.

2. A pressure gauge of the class described, comprising a base, a diaphragm cooperating with said base to form a pressure chamber, a backing plate for said diaphragm, said backing plate providing a pair of spaced ears having elongated bearing apertures formed therein, a crank rotatably mounted in said apertures, means operatively to connect said diaphragm and crank for operating the latter and maintaining the same at one end of said apertures, a pointer driven by said crank, and a U-shaped spring for returning said pointer, said spring having one end attached to said pointer and a second end passing through the space in one of said apertures not occupied by the portion of the crank journaled therein.

3. A pressure gauge of the class described, comprising a metal cup, a diaphragm cooperating therewith to form a diaphragm chamber, a backing plate for said diaphragm, a pointer rotatably mounted in said cup, a crank operated by said diaphragm for driving said pointer, a spring for holding said pointer in zero position, a stop integral with said pointer for engaging a portion of the wall of said cup to limit movement thereof under the influence of said spring, and a second stop integral with said pointer for engaging another portion of the wall of said cup to limit movement thereof in the opposite direction.

4. An integral sheet metal pointer comprising a pointer arm, a U-shaped base having spaced bearing portions, a stop arm extending from one side of said base to determine the zero position of said pointer, an operating arm extending from the other side of said base, and a second stop arm extending from the latter side of said base to limit maximum travel of the pointer, said operating arm having a twisted portion terminating in a semi-cylindrical portion adapted to engage a driving means.

5. An integral sheet metal pointer comprising a pointer arm, a U-shaped base having spaced bearing portions, a stop arm extending from one side of said base to determine the zero position of said pointer, an operating arm extending from the other side of said base and having a twisted portion terminating in a semi-cylindrical portion adapted to engage a driving means, and a second stop arm extending from the same side of said base as said operating arm to determine maximum travel of said pointer, said arms including relatively narrow portions along which the arms may be bent to dispose the same in different positions for adjusting operation of the pointer.

6. A pressure gauge of the class described, comprising a diaphragm, means forming a casing cooperating with said diaphragm to form a diaphragm chamber, a backing plate for said diaphragm, said backing plate providing ears having bearings, a crank mounted in said bearings and driven by said diaphragm, a pointer having a U-shaped base providing spaced bearings and opposite edges extending between said bearings, a stop arm integral with one of said edges and projecting outwardly therefrom in a direction to engage said casing for limiting movement of the pointer in one direction, an integral operating arm extending from the opposite edge of the base of said pointer and engageable with a portion of said crank and driven thereby, and a spring for returning said pointer and holding said stop in engagement with a wall of the casing to determine the zero position of the pointer.

7. A pressure gauge of the class described, comprising a base, a diaphragm cooperating with the base to provide a pressure chamber, means for admitting fluid under pressure to the chamber, a backing plate for the diaphragm, the backing plate having integral ears projecting therefrom and a central opening, one of said ears having an elongated opening therein and the other of the ears having a bayonet slot therein with its closed end remote from the backing plate and aligned with the corresponding end of the elongated opening, a thrust member carried by the central portion of the diaphragm and extending through the central opening in the backing plate, a crank rotatably mounted in the elongated opening and the bayonet slot, the crank having an offset portion engageable with the thrust member, the ears being located on a line offset laterally from the thrust member and the latter being so dimensioned that the plane of the offset portion of the crank is generally parallel with the backing plate when the offset portion of the crank engages the thrust member, an arm on the crank extending away from the backing plate adjacent the bayonet slot, indicating means operatively engageable with the arm, and a return spring urging the indicating means against the arm to urge the offset portion of the crank against the thrust member and thereby to retain the crank in the closed end of the bayonet slot.

GEO. E. COXON.

REFERENCES CITED

The following references are of record in the file of this patent:

UNITED STATES PATENTS

| Number | Name | Date |
|---|---|---|
| 27,341 | Ashcroft | Mar. 6, 1860 |
| 146,716 | Schmidt | Jan. 20, 1874 |
| 1,465,768 | Mapel | Aug. 21, 1923 |
| 1,647,342 | Carter | Nov. 1, 1927 |
| 1,781,818 | Mason | Nov. 18, 1930 |
| 1,805,176 | Hastings | May 12, 1931 |
| 1,841,543 | McKeown | Jan. 19, 1932 |
| 2,064,198 | Durant | Dec. 15, 1936 |
| 2,220,902 | Hastings et al. | Nov. 12, 1940 |
| 2,253,769 | Dube | Aug. 26, 1941 |

FOREIGN PATENTS

| Number | Country | Date |
|---|---|---|
| 565,676 | France | Nov. 10, 1923 |
| 651,468 | France | Oct. 9, 1928 |
| 528,216 | Great Britain | Oct. 24, 1940 |